Figure 1:
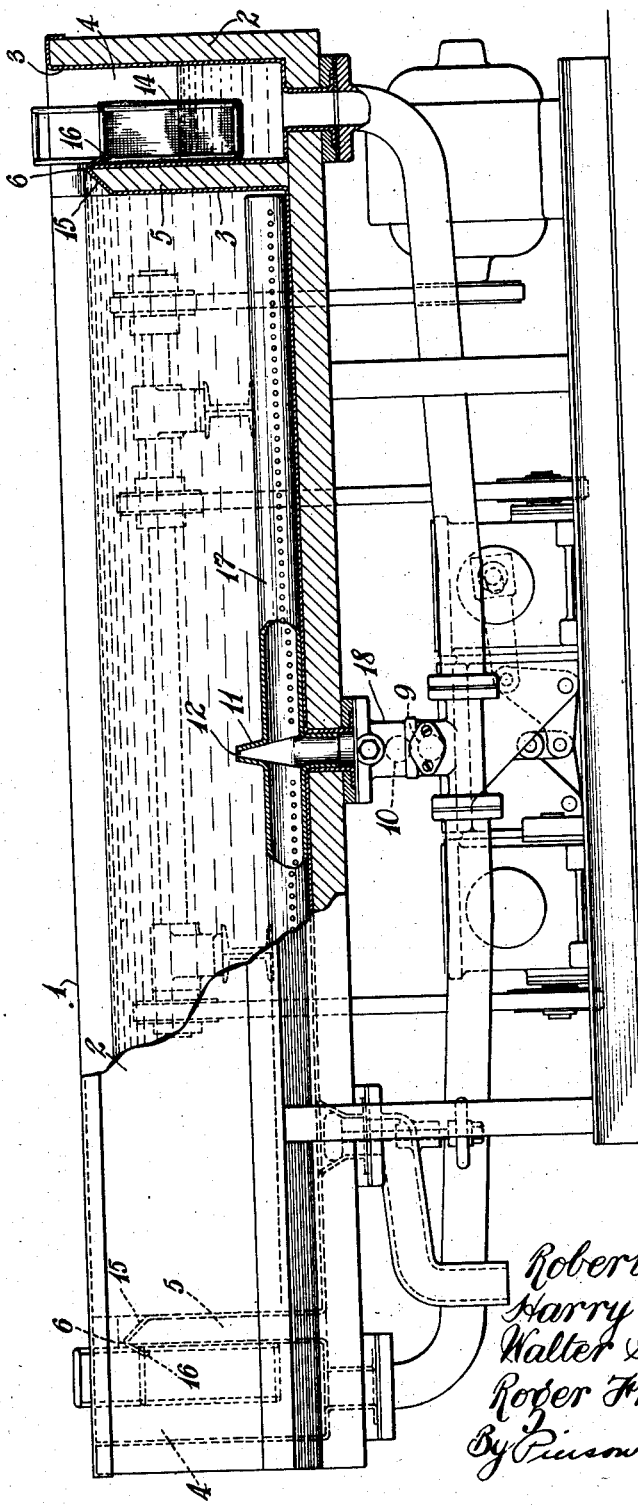

Patented Oct. 7, 1930

1,777,648

UNITED STATES PATENT OFFICE

ROBERT FERRIER McKAY, HARRY WILLSHAW, WALTER GEORGE GORHAM, AND ROGER FREDERICK LEE, OF BIRMINGHAM, ENGLAND, ASSIGNORS TO AMERICAN ANODE, INCORPORATED, OF NEW YORK, N. Y., A CORPORATION OF DELAWARE

APPARATUS FOR CIRCULATION OF LIQUIDS

Application filed February 27, 1928, Serial No. 257,500, and in Great Britain March 2, 1927.

This invention relates to apparatus for circulating the liquid dispersions or emulsions in order to prevent the separation therefrom of their constituents and is particularly applicable to those liquid dispersions comprising constituents which owing to their different specific gravities tend to separate from said liquids as by sedimentation or flotation or those which are liable to undergo flocculation or coagulation on being subjected to, for instance, immoderate agitation or impact shock.

Liquid dispersions or emulsions contemplated as coming under consideration in this invention comprise the latices of rubber or other vegetable resins, artificial dispersions such as of rubber or of other vegetable resins or of coagulated rubber or of waste rubber or rubber reclaim, or vulcanized dispersions of rubber or other vegetable resins or artificial dispersions of synthetic resins or cellulose compounds or again mixtures of any of the aforesaid dispersions, any of which may or may not contain any one or more of the usual and known compounding ingredients.

Although the principal objects of the invention are to circulate the dispersions so as to maintain the dispersions in a uniform condition and to avoid and/or to remove the effects of flocculation or coagulation as far as possible, other objects will become apparent as the description proceeds.

According to this invention the apparatus for circulating liquid dispersions of the aforesaid kinds and of the aforesaid natures comprises a container vessel (hereinafter called a vat), one or more auxiliary vessels (hereinafter called sumps) whereby in the liquid level may always be below that in the vat, means for forcing or pumping the dispersions from the sump or sumps to the vat without affecting or materially affecting their physical properties, means for maintaining the dispersions in a uniform condition and for ensuring an even surface flow, and means whereby the liquids may gravitate gently from the vat to the sump or sumps. In addition the apparatus may comprise means for sieving the dispersions to remove any coagulum or agglomerated or flocculated matter which may form in the dispersions.

The liquid dispersions in the vat may be used for producing, by dipping, deposits on formers which may be porous hollow shapes, for example, impregnated with coagulant and to which suction may be applied or again in the deposition on moulds by electrophoretic deposition or a combination of both methods or the vat may be utilized for any operations such as spreading, coating and the like where it is a desideratum that the deposits should be uniform.

A preferred embodiment of apparatus for circulating rubber latex containing compounding ingredients is shown in the accompanying drawings in which:—

Figure 2:
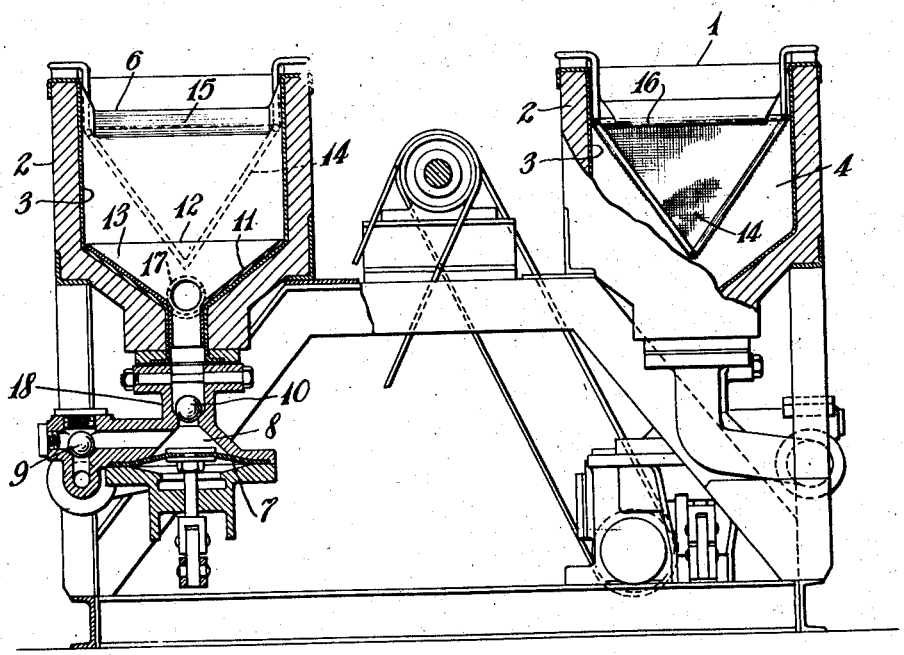

Figure 1 is a side elevation partly in section, while figure 2 is an end elevation partly in section.

In the drawings we illustrate a dual arrangement but as the two halves thereof are essentially independent and substantially identical the description concerns itself only with one half of the apparatus.

The vat comprises a comparatively long rectangular dipping tank 1 provided with wooden walls 2 covered with lead sheathing 3.

The replenishing sumps 4 are preferably arranged as illustrated one at each end of the said vat. As shown in the drawings said sumps are formed by dividing the vat by wooden partitions 5 sheathed with lead similarly to the vat. Alternatively, however they may be separate vessels.

The means whereby the latex gravitates from the vat to the sumps may conveniently comprise weirs 6 adjacent the top edge of each said partition 5, over which weirs the latex flows into the said sumps. It will be apparent that we may utilize any suitably arranged system of ducts, pipes or the like but when the sumps are integral with the vat or arranged in close proximity thereto, the said weirs are conveniently, as shown in the drawings, formed by suitably shaping the intervening partitions 5.

For circulating the latex from the replenishing sumps to the vat, the means described in our copending application of even date may be employed, but any other means adapted to avoid coagulation may be utilized.

Thus the means may comprise, for instance a diaphragm 7 preferably of rubber horizontally disposed and adapted to be displaced vertically within a chamber or cavity 8 connected with the vat 1 and with the sumps 4; valves being provided, 9 between the diaphragm and the sump, 10 between the diaphragm and the vat respectively. In the suction stroke of the pump the vat valve 10 is closed, the sump valve 9 is opened and latex flows into the aforesaid chamber or cavity 8. In the delivery stroke the sump valve is closed the vat valve is opened and the latex in the said cavity is forced upwards through the vat valve into the vat.

Means may be provided to remove surface coagulum occasioned for instance by exposure of the surface of the latex to atmosphere or again by contacting the said surface with the coagulant-coated formers which are utilized in some deposition processes.

It will be apparent that for that purpose an even surface-flow is essential and to achieve that end we preferably provide that the main delivery nozzle 11 is disposed centrally of the vat floor, its orifice 12 pointing upwards. As illustrated in Figure 2 of the drawings, the said delivery nozzle has a fan shaped formation 13 disposed transversely of the vat. Thus the replenishing latex from the sumps is caused to flow towards the surface of the latex across the centre of the vat midway between the two ends thereof. Thereby we ensure that the whole surface of the latex is in movement—flowing outwardly towards one or other of the weirs and carrying with it any surface coagulum which has formed.

To strain the latex, particularly to remove the surface coagulum we preferably provide, between each overflow weir and replenishing sump, a seive 14 of any convenient construction, preferably however, of fabric gauze or the like shaped to a tapering formation as shown in Figure 2. In transit from the vat to the sumps the latex passes through the said sieve which retains any foreign matter such as the coagulum referred to.

The shape or arrangement of the weirs, ducts or other overflow system is such as to avoid as far as possible any splashing of the latex as it flows from the vat into the sieve or sump, otherwise coagulation or thickening of the latex might ensue. A convenient arrangement, as shown in the drawings consists in the provision of a sloping surface 15 between the edge of the weir and the top of the sieve. The latex flows down said sloping surface and is transferred therefrom via the curved lip 16 thereof directly onto the side of the said sieve the lower part whereof is submerged in the latex accumulated in the sump.

To obviate sedimentation, we provide a perforated distribution pipe 17, or pipes, extending along the floor of the vat, and into or across which the delivery of the pump discharges. When the apparatus is in use the jets of latex forced through the said perforations prevent the accumulation of sediment upon the floor of the vat and further agitate and disperse any such sediment resulting from protracted periods of disuse of the apparatus. As shown in the drawings the delivery pipe 18 of the pump preferably connects with the underside of the distribution pipe 17 while the fan shaped nozzle 11 preferably projects from the upper side of the distribution pipe 17 immediately above the inlet thereinto of the delivery pipe.

It will be apparent that the apparatus offers the advantage that a constant level may be maintained in the vat irrespective of varying displacement due to the difference in size of the formers when such are used and irrespective also of the varying consumption of the latex; the varying displacement and consumption merely altering the level in the sump.

It will be understood that the apparatus of the invention is not restricted to the precise details of construction or arrangement described. Thus the vat container may have any desired form—it might for instance be circular. Then its rim might form an annular weir toward which the latex would flow from the centre of the vat—in this arrangement the delivery nozzle of the forcing means being conveniently circular in cross section.

What we claim is:

1. Apparatus for circulating through a container and maintaining therein in a uniform condition liquid dispersions of the aforesaid kinds containing constituents which on account of their different specific gravities of their nature tend to separate from said liquids as by sedimentation, flotation flocculation, coagulation or the like, comprising a high level container, a low level sump, means for forcing the dispersions from the sump, to the container without affecting or materially affecting the characteristics of the dispersons and means whereby the liquid may gently gravitate from the container to the sump substantially as described.

2. Apparatus as claimed in claim 1 provided with means for maintaining the dispersions at a constant level substantially as and for the purpose described.

3. Apparatus as claimed in claim 1 wherein the outflow from and the inflow into the said container are so related as to occasion an even surface flow of the said liquid substantially as described.

4. Apparatus as claimed in claim 1 wherein the liquid is transferred from the said sump to the said container through the bottom of the container substantially as and for the purpose described.

5. Apparatus as claimed in claim 1 wherein the orifice of the delivery nozzle is so shaped and disposed as to project the liquid upwardly into the said container in a stream initially flowing at right angles or substantially so as the line of flow of the surface liquid substantially as and for the purpose specified.

6. Apparatus as claimed in claim 1 wherein a perforated distribution mechanism is provided adjacent the floor of the container and into or across which distribution mechanism the delivery of the forcing means discharges substantially as described.

7. Apparatus as claimed in claim 1 wherein straining means are disposed between the container and the sump substantially as and for the purposes described.

8. Apparatus as claimed in claim 1 wherein overflow weirs or the like adapted to prevent or substantially to prevent splashing of the liquid are arranged, between the container and the sump substantially as and for the purpose described.

9. Apparatus for circulating through a container and maintaining therein in a uniform condition liquid dispersions containing dispersed rubber such as rubber latices which tend to separate from the liquid as by sedimentation, flotation, flocculation, coagulation or the like comprising a high level container having V-shaped bottom walls, a low level sump, and means for forcing the liquid dispersion from the sump into the container without materially affecting the characteristics of the dispersion, said means including means for distributing the dispersion into the container along the line of convergence of the V-shaped walls.

10. Apparatus for circulating through a container and maintaining therein in a uniform condition liquid dispersions containing dispersed rubber such as rubber latices which tend to separate from the liquid as by sedimentation, flotation, flocculation, coagulation or the like comprising a high level container having V-shaped bottom walls, a low level sump, means for forcing the liquid dispersion from the sump into the container without materially affecting the characteristics of the dispersion, said means including means for distributing the dispersion into the container along the line of convergence of the V-shaped walls, and means for directing the gentle gravity flow of the surface portion of the liquid of the container into the sump.

11. Apparatus for circulating through a container and maintaining therein in a uniform condition liquid dispersions containing dispersed rubber such as rubber latices which tend to separate from the liquid as by sedimentation, flotation, flocculation, coagulation or the like comprising a high level container having downwardly converging bottom walls, a low level sump, and means for forcing the liquid dispersion from the sump into the container without materially affecting the characteristics of the dispersion, said means including means for uniformly distributing the dispersion into the container at the convergence of the bottom walls.

12. Apparatus for circulating through a container and maintaining therein in a uniform condition liquid dispersions containing dispersed rubber such as rubber latices which tend to separate from the liquid as by sedimentation, flotation, flocculation, coagulation or the like comprising a high level container having downwardly converging bottom walls, a low level sump, and means for forcing the liquid dispersion from the sump into the container without materially affecting the characteristics of the dispersion, said means including means for distributing the dispersion into the container at the convergence of, and generally parallel to, the bottom walls.

In witness whereof, we have hereunto signed our names.

ROBT. F. McKAY.
HARRY WILLSHAW.
WALTER GEORGE GORHAM.
ROGER FREDERICK LEE.